J. E. PECK.
HOT WATER BOILER.
APPLICATION FILED MAY 28, 1907.

922,442.

Patented May 18, 1909.
3 SHEETS—SHEET 1.

WITNESSES
Chas. H. Hughes.
W. E. Chase

INVENTOR
James E. Peck
BY
Howard P. Denison
ATTORNEY

J. E. PECK.
HOT WATER BOILER.
APPLICATION FILED MAY 28, 1907.
922,442.
Patented May 18, 1909.
3 SHEETS—SHEET 2.
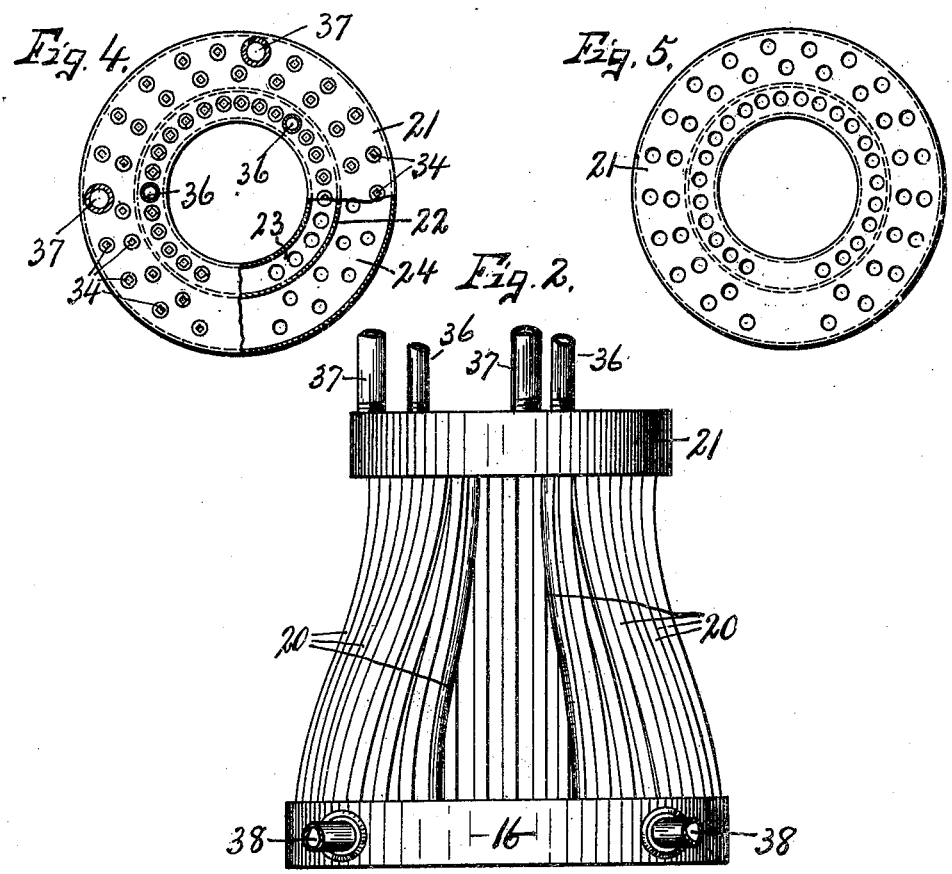
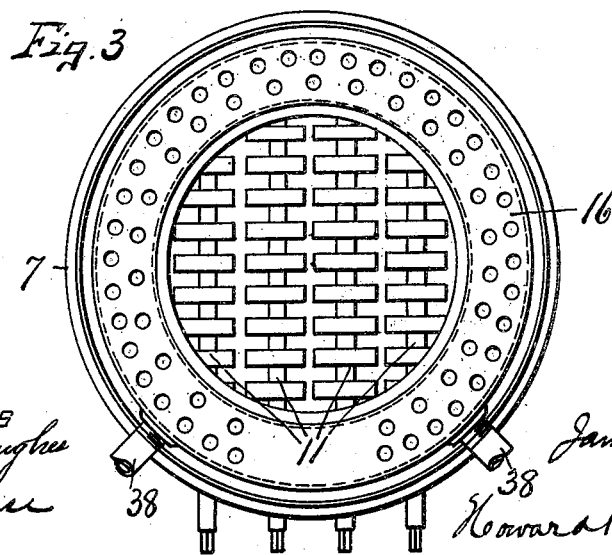
WITNESSES
Chas. H. Hughes
W. E. Chase
INVENTOR
James E. Peck
BY
Howard P. Denison
ATTORNEY J. E. PECK.
HOT WATER BOILER.
APPLICATION FILED MAY 28, 1907.
922,442.
Patented May 18, 1909.
3 SHEETS—SHEET 3.
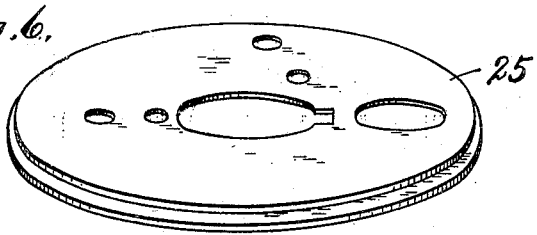
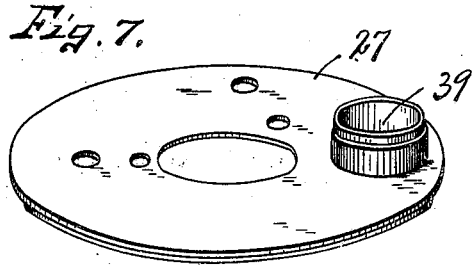
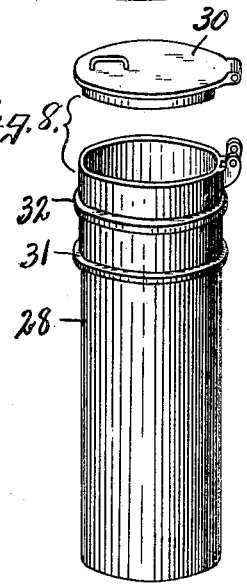

UNITED STATES PATENT OFFICE.

JAMES E. PECK, OF SYRACUSE, NEW YORK, ASSIGNOR TO VULCAN FOUNDRY COMPANY, OF GRAND RAPIDS, MICHIGAN, A CORPORATION.

HOT-WATER BOILER.

No. 922,442.   Specification of Letters Patent.   Patented May 18, 1909.

Application filed May 28, 1907.   Serial No. 376,127.

*To all whom it may concern:*

Be it known that I, JAMES E. PECK, of Syracuse, in the county of Onondaga, in the State of New York, have invented new and useful Improvements in Hot-Water Boilers, of which the following, taken in connection with the accompanying drawings, is a full, clear, and exact description.

This invention relates to certain improvements in hot water boilers involving the use of lower and upper horizontal water rings of unequal diameter, that at the top being the smaller and connected to the lower water ring by upright inwardly converging water tubes, and a fuel magazine extending through the upper ring into proximity to the lower ring.

My main object is to heat a maximum volume of water of circulation with a minimum quantity of fuel in the shortest period of time by connecting the base and top water rings by a plurality of circular rows of upright upwardly converging water tubes of comparatively small size, forming with the water rings the greater portion of the combustion chamber and affording a large heating area exposed directly to the impact of the products of combustion; that is, the entire volume of water in the boiler is split up into a large number of comparatively small columns retained in the upright tubes, and, therefore, quickly heated by reason of the aggregate area of such pipes or tubes exposed to the products of combustion.

A further object is to divide the upper water ring into inner and outer annular compartments, and to connect the inner circular row of tubes rising from the water base to the inner compartment so that the latter may be used for a separate circulating system for heating remote or more exposed parts of the building.

A still further object is to provide a comparatively low-down furnace or water heater having a fuel magazine sufficiently low that the fuel may be fed in at the top.

Other objects and uses relating to the specific parts of the boiler will be brought out in the following description.

Figure 1:
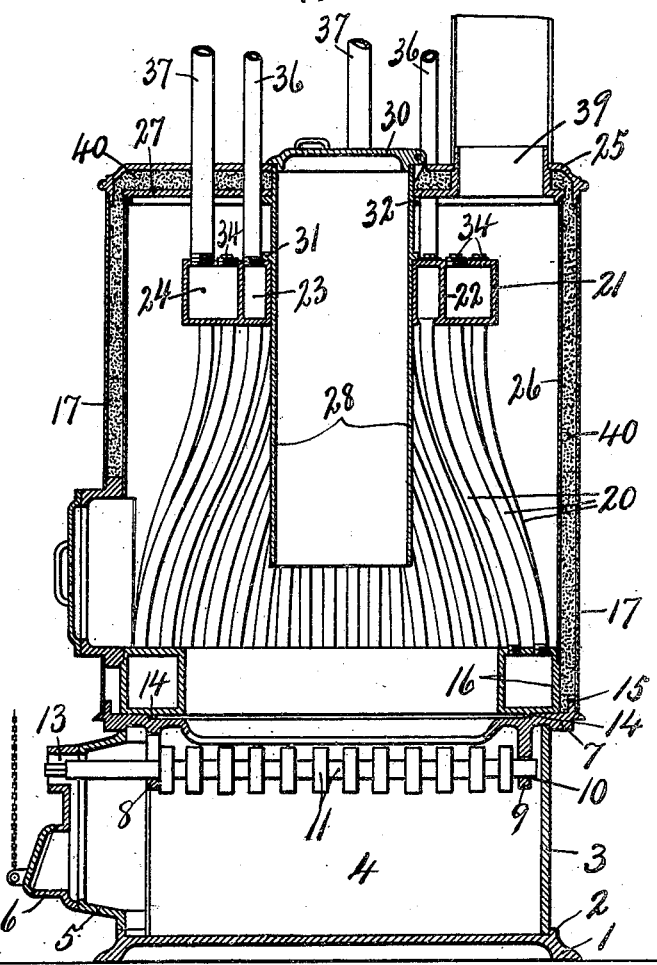
Figures 9, 10:
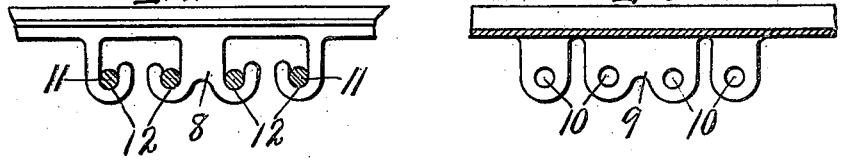

In the drawings—Figure 1 is a transverse vertical sectional view from front to rear of a hot water boiler embodying the various features of my invention. Fig. 2 is a front elevation of the base and top water rings and connecting tubes forming the combustion chamber as detached from the boiler. Fig. 3 is a top plan of the lower water ring or base and underlying portions of the boiler. Figs. 4 and 5 are respectively a top plan and an inverted plan of the upper water ring, portions thereof being broken away in Fig. 4, to show the inner and outer concentric compartments. Figs. 6, 7 and 8 are perspective views respectively of the two upper decks or plates and magazine. Figs. 9 and 10 are respectively front elevations of the front and rear portions of the grate-supporting ring.

In carrying out the objects stated, I provide a circular base —1— with an annular flange —2— within which is fitted a segmental shell —3—, forming with the base —1— an ash-box —4—, the base —1— and shell —3— being preferably made of cast-iron, the latter being open at its front side, around which is fitted a door-frame —5— for receiving an ash-door —6—.

A grate-ring —7— of cast metal is seated upon the upper edge of the shell —3— and is provided at its front and rear respectively with pendent flanges —8— and —9— within and extending some distance below the top edge of the shell —3—. The rear flange —9— is provided with a series of, in this instance four, apertures —10— for receiving the rear ends of a corresponding number of grate-bars —11—, while the front flange —8— is provided with a corresponding number of bearings —12—, which are preferably open at the top and serve to support the front ends of the grate-bars —11—, the object of leaving the bearings —12— open at the top, being to permit the grate-bars to be removed or replaced when desired without disturbing any of the other parts of the boiler other than the mere opening of the ash-door —6—, which is provided with apertures —13—, one for each grate-bar to receive a suitable shaking-tool, not shown.

The grate-ring —7— and grates —11— form the bottom of the fire-box, and if for any reason it is desired to remove either one or all of the grate-bars —11—, it is simply necessary to open the door —6—, whereupon the front end of any one of the grate-bars may be raised by hand out of its bearings —12—, and then dropped down between said bearings, at the same time drawn forwardly to disengage its rear end from the apertures —10—, the operation being reversed in replacing the grate-bars, and when in position with the door —6— closed the upper side of the apertures 13— prevent the elevation of the front end of the grate-bars sufficiently to disengage them from their bearings —12—. This grate-ring —7— is provided with inner and outer concentric shoulders —14— and 15— forming suitable seats for a water-ring-base —16— and an outer jacket or shell —17—. The base-water-ring —16— is seated directly upon the top face of and is of slightly less diameter than the grate-ring —7— and is held against lateral displacement by the annular shoulder —14— and a similar shoulder formed upon the bottom of the base-ring, this water-ring also forming the base of the combustion chamber.

Secured to and rising from the top of the water-ring —16— are inner and outer circular rows of water tubes —20—, which converge upwardly and are connected at their upper ends to a second water-ring —21— having an annular partition —22— which divides the interior of the water-ring —21— into inner and outer compartments —23— and —24—. This top ring —21— is of considerably less diameter than that of the base-ring —16—, or in other words, its exterior diameter is about equal to the interior diameter of the latter ring, and owing to its reduced diameter, the upper ends of the tubes —20— preferably enter the bottom of the ring —21— in three circular rows, the inner row of tubes nearest the combustion chamber being connected to the compartment —23—, while the other tubes are connected to the outer compartment —24—. The object in converging the tubes —20— upwardly from the base-ring —16— to the water-ring —21— is to produce as large a fire-box as practicable with this size of heater, and at the same time to cause the upper ends of the flues to overhang the fire-box, and in this way receive as nearly direct impact of the products of combustion against the flues as practicable with this style of heater. The upright water tubes of the several rows are arranged close together and staggered with each other, but are still spaced a slight distance apart and although the fire may pass between them, they nevertheless retard or baffle the upright passage of the products of combustion, and I, therefore, omit several of the tubes at the front of the boiler, as best seen in Fig. 2, which not only afford an outlet for the greater part of the smoke, but also leaves ample space for the manipulation of a suitable cleaning tool for removing soot, and other accumulations upon the tubes and other interior parts of the boiler.

The jacket 17— extends some distance above the horizontal plane of the top face of the ring —21— and supports at its upper end an upper deck or plate —25—. A second jacket —26— surrounds the upper end of the base-ring —16— and water tube —20— and extends some distance above the upper water ring —21— which it surrounds and supports an intermediate deck or plate —27—.

The water-ring —21— is supported wholly upon the upper ends of the water tubes —20—, which, in turn, are supported by the lower water ring —16—, said upper water-ring being provided with a central opening, in which is loosely fitted a magazine —28—, having its lower end terminating a short distance above the base-ring —16— and its upper end terminating in a plane substantially coincident with the top face of the upper deck —25— where it is provided with a suitable lid —30—. This magazine —28— is supported wholly upon the top face of the upper water ring —21— by means of an annular flange —31—, while the intermediate deck —27— is supported by the upper end of the intermediate shell —26—, and also by an annular flange —32— on the upper end of the magazine —28— just above the annular shoulder —31—.

The upper end of the tubes —20— where they enter the bottom of the upper water-ring —21— are expanded thereinto, and in order that the expanding tool may be inserted for this purpose, the upper side of the ring —21— is provided with a series of apertures in vertical alinement with the tubes and normally closed by plugs —34— when the work of expanding the ends of the tubes is completed.

The water from the compartments —23— and —24— may be distributed through the circulating system through one or more upflow pipes —36— and —37— and returned through one or more return pipes —38— to the base-ring —16—, the upflow pipes extending through suitable openings in the upper decks —25— and —27—, which are also formed with a smoke outlet —39—.

The outer and inner jackets —17— and —26— and also the upper decks or plates —25— and —27— are spaced a slight distance apart and these spaces are filled in with a lining —40— of asbestos, or other heat insulating material.

The magazine —28— extends downwardly centrally through the upper water ring —21— and surrounding tubes —20— and terminates a sufficient distance above the lower water-ring —16— to permit the fuel fed therethrough to spread out more or less evenly over the entire grate-surface, or so as to substantially fill the fire-box inclosed by the water-ring —16— and grate-ring —7—, leaving the products of combustion to escape at the side of the magazine between the tubes, from whence they pass upwardly through the smoke flue —39—.

It will be observed that the water ring

—21— is spaced apart and separate from the inner jacket and also from the inner upper deck and is, therefore, of less diameter than said jacket forming an intervening space at the sides and above the upper water ring so that the latter will be entirely enveloped in the products of combustion thereby more rapidly heating the water and establishing a more effective circulation with a minimum quantity of fuel.

The inner circular row of hot water tubes —20— nearest the combustion chamber previously stated communicate with the inner annular compartments —23— of the upper water ring —21—, and the water therein being subjected to more intense heat by reason of its proximity to the fire, it is evident that the water will be heated with greater expediency and will be maintained at a higher degree of heat so that this water may be used as a separate circulating system for heating remote or more exposed parts of the building, while the water in the other tubes communicating with the compartment —24— may constitute another circulating system for heating less exposed rooms, or those nearest the boiler. In both circulating systems, however, the water is returned through the same or different pipes to the common chamber in the lower water ring.

What I claim is:

1. In a hot water boiler, the combination of lower and upper water rings, the upper water ring being of less diameter than the lower ring and provided with separate annular compartments, and separate circular rows of upwardly converging water tubes connecting said rings, one row of tubes leading to one compartment and another row of tubes leading to the other compartment.

2. In a hot water boiler, the combination of lower and upper water-rings, the upper water ring having separate compartments, a series of water tubes connecting the lower ring with one of the compartments, and a separate series of water tubes connecting said lower ring with the other compartment.

3. In a hot water boiler, the combination of lower and upper water rings, the upper water ring being of less diameter than the lower water ring and provided with an annular partition dividing it into two annular compartments, a lower row of upwardly converging water tubes leading from the lower ring to one compartment, and a separate circular row of water tubes leading from the lower ring to the other compartment.

4. In a hot water boiler, the combination of lower and upper water rings, the upper water ring being of less diameter than the lower water ring and provided with an annular partition dividing it into two annular compartments, a lower row of upwardly converging water tubes leading from the lower ring to one compartment, and a separate circular row of water tubes leading from the lower ring to the other compartment, and a fuel magazine extending through the upper water ring.

5. In a hot water boiler, the combination of lower and upper water rings, the upper ring having an annular partition dividing it into two annular compartments, a series of upwardly converging water tubes connecting the lower ring with the inner compartment, and a second series of water tubes connecting said lower ring with the other compartment.

6. A hot water boiler comprising an ash-box, a grate ring supported upon the ash-box, a grate supported upon the ring, a water ring resting on the grate-ring, upwardly converging circular rows of tubes rising from the water ring, a second water-ring secured to and communicating with the upper ends of the tubes, a fuel magazine extending centrally through the second water-ring, and inner sheet metal jacket surrounding the water tubes and second water-ring, an upper deck resting upon the upper end of the inner jacket and provided with a smoke flue, an outer sheet metal jacket surrounding and of slightly greater diameter than the inner jacket and resting upon a grate ring, a second upper deck resting upon the upper end of the outer jacket and a filling of heat resisting material between the two jackets and between the two upper decks.

In witness whereof I have hereunto set my hand this 23d day of May 1907.

JAMES E. PECK.

Witnesses:
H. E. CHASE,
C. M. McCORMACK.